(12) United States Patent
Huang et al.

(10) Patent No.: US 11,957,264 B2
(45) Date of Patent: Apr. 16, 2024

(54) MULTIFUNCTIONAL COOKER

(71) Applicant: GUANGDONG SHUNDE OUNING TECHNOLOGY ELECTRICAL APPLIANCE CO., LTD., Guangdong (CN)

(72) Inventors: Zhenxiong Huang, Guangdong (CN); Yun Yang, Guangdong (CN)

(73) Assignee: GUANGDONG SHUNDE OUNING TECHNOLOGY ELECTRICAL APPLIANCE CO., LTD., Guangdong (CN)

( * ) Notice: Subject to any disclaimer, the term of this patent is extended or adjusted under 35 U.S.C. 154(b) by 937 days.

(21) Appl. No.: 16/964,200

(22) PCT Filed: Nov. 16, 2018

(86) PCT No.: PCT/CN2018/115841
§ 371 (c)(1),
(2) Date: Jul. 23, 2020

(87) PCT Pub. No.: WO2019/237653
PCT Pub. Date: Dec. 19, 2019

(65) Prior Publication Data
US 2021/0038012 A1    Feb. 11, 2021

(30) Foreign Application Priority Data

Nov. 1, 2018   (CN) .......................... 201811296697.6

(51) Int. Cl.
*A47J 27/09*    (2006.01)
*A47J 27/086*   (2006.01)

(52) U.S. Cl.
CPC ............. *A47J 27/09* (2013.01); *A47J 27/086* (2013.01)

(58) Field of Classification Search
CPC ....... A47J 27/086; A47J 37/0641; A47J 27/09
(Continued)

(56) References Cited

U.S. PATENT DOCUMENTS 3,820,524 A * 6/1974 Buckell ................. A47J 27/086
                                                     219/401
3,977,388 A * 8/1976 Breedveld ............... F24H 3/065
                                                     126/110 R
(Continued)

FOREIGN PATENT DOCUMENTS

CN     201052067     4/2008
CN     105902144     8/2016
(Continued)

OTHER PUBLICATIONS

"International Search Report (Form PCT/ISA/210) of PCT/CN2018/115841", dated Feb. 27, 2019, with English translation thereof, pp. 1-6.

*Primary Examiner* — Eric S Stapleton
(74) *Attorney, Agent, or Firm* — JCIP GLOBAL INC.

(57) ABSTRACT

A multifunctional cooker includes a cooker body and an upper cover assembly. The upper cover assembly is provided with a heating assembly and a wind power assembly, and the multifunctional cooker is provided with a first member cooperated with the upper cover assembly. The first member is provided with an air duct, and the first member realizes sealing of the cooker body or realizes releasing of the sealing of the cooker body through a state change of the air duct. The first member is capable of releasing pressure when the pressure inside the cooker body exceeds a threshold.

14 Claims, 9 Drawing Sheets

(58) Field of Classification Search
USPC .......................................................... 99/352
See application file for complete search history.

(56) References Cited

U.S. PATENT DOCUMENTS

| | | | | |
|---|---|---|---|---|
| 4,155,293 | A * | 5/1979 | Spiel | A47J 27/18 99/404 |
| 4,258,879 | A * | 3/1981 | Nischwitz | F24B 1/183 261/119.1 |
| 4,538,509 | A * | 9/1985 | Ojima | A21B 1/40 366/144 |
| 4,798,939 | A * | 1/1989 | Nett | A47J 27/086 219/415 |
| 4,892,083 | A * | 1/1990 | Konig | A21B 1/26 219/400 |
| 4,984,557 | A * | 1/1991 | Konig | A21B 1/24 219/400 |
| 5,129,384 | A * | 7/1992 | Parks | A21B 1/44 126/21 R |
| 5,142,966 | A * | 9/1992 | Morandi | A47J 27/18 99/330 |
| 5,463,938 | A * | 11/1995 | Sarukawa | A21C 9/04 118/16 |
| 6,142,064 | A * | 11/2000 | Backus | A47J 37/047 99/421 H |
| 6,173,645 | B1 * | 1/2001 | Backus | A47J 37/0635 220/326 |
| 6,389,958 | B1 * | 5/2002 | Ono | A23L 3/10 422/26 |
| 6,497,276 | B2 * | 12/2002 | Clark | F25D 23/12 219/719 |
| 6,647,864 | B1 * | 11/2003 | Fang | A47J 27/14 99/332 |
| 6,755,121 | B2 * | 6/2004 | Klouda | F24C 15/2007 99/476 |
| 7,325,484 | B1 * | 2/2008 | Backus | A47J 37/041 99/421 H |
| 2001/0009128 | A1 * | 7/2001 | Backus | A47J 37/0641 99/421 H |
| 2002/0023547 | A1 * | 2/2002 | Backus | A47J 37/042 99/427 |
| 2002/0108500 | A1 * | 8/2002 | Backus | A47J 37/041 99/421 H |
| 2004/0144260 | A1 * | 7/2004 | Backus | A47J 37/047 99/421 H |
| 2005/0029249 | A1 * | 2/2005 | Wanat | A47J 27/004 219/494 |
| 2007/0283820 | A1 * | 12/2007 | Paredes Urzua | A47J 43/128 99/324 |
| 2008/0083730 | A1 | 4/2008 | Dolgov et al. | |
| 2008/0099461 | A1 * | 5/2008 | Li | F24C 7/06 219/402 |
| 2008/0302253 | A1 * | 12/2008 | Salvaro | F24C 15/00 99/341 |
| 2010/0064902 | A1 * | 3/2010 | Sakane | F24C 15/2007 99/474 |
| 2013/0156906 | A1 * | 6/2013 | Raghavan | F24C 7/06 426/243 |

FOREIGN PATENT DOCUMENTS

| | | |
|---|---|---|
| CN | 107684357 | 2/2018 |
| CN | 207266699 | 4/2018 |
| CN | 108634807 | 10/2018 |
| JP | 2017101909 | 6/2017 |
| WO | 2017105076 | 6/2017 |

* cited by examiner

MULTIFUNCTIONAL COOKER

CROSS-REFERENCE TO RELATED APPLICATION

This application is a 371 of international application of PCT application Ser. No. PCT/CN2018/115841, filed on Nov. 16, 2018, which claims the priority benefit of China application no. 201811296697.6, filed on Nov. 1, 2018. The entirety of each of the above mentioned patent applications is hereby incorporated by reference herein and made a part of this specification.

BACKGROUND

Technical Field

The present invention relates to a kitchenware, and in particular, relates to a multifunctional cooker.

Description of Related Art

Existing consumers are constantly pursuing healthy cooking and a diet full of color, aroma and taste. Pressure cooking has pressure penetration and can reach a certain temperature. It is generally considered in the market that this function may realize healthy and nutritious cooking. However, after using pressure cooking, the skin color and taste of the food cannot achieve the sense of crispy and delicious. If it can also be baked, the food will be full of color, aroma and taste, plus function of health and nutrition, and the food will be popular with consumers and has huge market potential. The existing pressure cooker only has the function of pressure cooking. Similarly, the existing air fryer only has the function of cooking food by hot air. At present, there is no product that has both functions of pressure cooking and air baking and frying. The invention integrates the functions of pressure cooking and air baking and frying, and realizes two functions on one product. It can not only realize functions of pressure cooking for rice, porridge, soup and other functions, but also use the product to realize functions of frying potato chips, chicken wings, beef, and spareribs and other functions. It may also use the product to pressure cook and then bake and fry the food, so that the pressure cooking and the baking and frying are used as two cooking stages for the same food. The multifunctional cooker realizes the multipurpose of one cooker.

SUMMARY

To overcome at least one of the defects in the above prior art, the present invention provides a multifunctional cooker integrated with functions of pressure cooker and air fryer, which conveniently realizes the switch between the function of pressure cooker and the function of air fryer.

In order to solve the above technical problems, the present invention adopts the following technical solution. A multifunctional cooker includes a cooker body and an upper cover assembly. The upper cover assembly is provided with a heating assembly and a wind power assembly. The multifunctional cooker is provided with a first member cooperated with the upper cover assembly. The first member is provided with an air duct. The first member realizes sealing of the cooker body or realizes releasing of the sealing of the cooker body through a state change of the air duct, and the first member is capable of releasing pressure when the pressure inside the cooker body exceeds a threshold.

The upper cover assembly is provided with the heating assembly and the wind power assembly. The requirements of the air fryer for flowing hot air are realized by the cooperation between the heating assembly and the wind power assembly. The first member provided on the multifunctional cooker is provided with an air duct capable of performing state change for opening or closing. When the air duct is closed, the first member is cooperated with the upper cover assembly to seal the cooker body, which satisfies the structural requirements of the multifunctional cooker when the function of pressure cooker is realized. When the function of air fryer is realized, the air duct is opened, the sealing of the cooker body is released, and the communication between the upper cover assembly and the cooker body is realized. The heating assembly and the wind power assembly provided on the upper cover assembly is cooperated with each other to heat the cooker body through the air duct, and the function of air fryer is realized, thereby realizing the multipurpose of one cooker. The first member can be cooperated with the cooker body to realize an increase in the pressure in the cooker body. When the pressure in the cooker body exceeds the threshold, the first member is used to release the pressure in the cooker body.

In one embodiment, the upper cover assembly is provided with a first position limiting member, and the first position limiting member is provided with an opening cooperated with the air duct. The first position limiting member moves relative to the first member, and opening and closing of the air duct is realized by a cooperation between the opening and the air duct. The first position limiting member is provided with the opening which can be cooperated with the air duct provided on the first member. The air duct is opened when the opening is coincided with the air duct, and the air duct is closed by the first position limiting member when the opening is misaligned with the air duct. The air duct is opened to realize the function of air fryer when the opening is coincided with the air duct, and the air duct is closed by the first position limiting member to realize the function of pressure cooker when the opening is misaligned with the air duct. The switch between functions of the multifunctional cooker is realized by the movement of the first position limiting member relative to the first member.

Preferably, the air duct is provided with a sealing gasket, and the sealing gasket realizes an airtight connection between the air duct and the first position limiting member. The sealing gasket provided on the air duct can realize the airtight connection between the air duct and the position limiting member, thereby improving the tightness between the air duct and the first position limiting member and avoiding air leakage of the air duct.

In one embodiment, the first member is connectable with the upper cover assembly. The first member is provided with a switch assembly cooperated with the air duct, and the switch assembly is capable of realizing opening and closing of the air duct. The first member is connectable with the upper cover assembly to realize that the first member is the defined by the upper cover assembly. The first member is provided with the switch assembly and the switch assembly is cooperated with the air duct, the air duct is opened and closed by the switch assembly to realize the switch between function of pressure cooker and function of air fryer.

Preferably, the switch assembly is provided with a sealing member rotatably cooperated with the first member, and the sealing member realizes sealing of the air duct by a driving structure. The switch assembly is provided with the sealing member, and the sealing member is defined by the first member. The sealing member can be rotated relative to the first member under the control of the driving structure. A position of the sealing member is adjusted relative to that of the air duct to realize opening or closing of the air duct by the sealing member.

Preferably, the first member is provided with a switch assembly cooperated with the air duct, and the switch assembly is capable of realizing opening and closing of the air duct. The first member is provided with the switch assembly which is capable of realizing opening and closing of the air duct, and the air duct is controlled by the switch assembly to realize the switch between function of pressure cooker and function of air fryer.

Preferably, the switch assembly is provided with a sealing member rotatably cooperated with the first member, and the sealing member realizes sealing of the air duct by a driving structure. The switch assembly is provided with the sealing member, and the sealing member is defined by the first member. The sealing member can be rotated relative to the first member under the control of the driving structure. A position of the sealing member is adjusted relative to that of the air duct to realize opening or closing of the air duct by the sealing member.

Preferably, the driving structure is provided with a driving member connected with the sealing member, and the first position limiting member is provided with a position limiting pair cooperated with the driving member. The driving member is driven by the position limiting pair to operate when the limiting member moves relative to the first member. The driving member is used for driving the rotation of the sealing member, and the first position limiting member is provided with the position limiting pair cooperated with the driving member. When the position limiting pair moves relative to the driving member, the driving member is controlled by the position limiting pair to drive the rotation of the sealing member, thereby realizing the sealing of the air duct.

In one embodiment, the first member is provided with at least two of the air ducts, and the at least two of the air ducts realize a cooperation between inletting of air and exhausting of air. The at least two of the air ducts realize inletting of air and exhausting of air, which meets the air flowing requirements of the air fryer.

In one embodiment, the first member is provided with a first position limiting mechanism which is cooperatively connectable with the first position limiting member. The upper cover assembly is provided with a second position limiting member. The first member is provided with a second position limiting mechanism which is cooperatively connectable with the second position limiting member. When the multifunctional cooker realizes the function of pressure cooker, the first position limiting member is cooperated with the first position limiting mechanism provided on the first member to position the first member. On the premise of the cooperation between the first position limiting member and the first position limiting mechanism, the fixed connection between the first member and the upper cover assembly is realized by the cooperation of the second position limiting member and the second position limiting mechanism.

Preferably, the first position limiting member is capable of realizing a fixed connection between the upper cover assembly and the cooker body. The first position limiting mechanism is a position limiting pair connected with the first position limiting member. The second position limiting member is a position limiting hole on the first position limiting member. The second position limiting mechanism is a position limiting post on the first member. The fixed connection between the upper cover assembly and the cooker body is realized by the first position limiting member, and the first position limiting member plays a limiting role in the connection between the upper cover assembly and the cooker body. The position limiting pair is connected with the first position limiting member to realize the fixed connection between the first member and the upper cover assembly. The second position limiting mechanism is arranged to be the position limiting post on the first member and the position limiting post is fitted with the position limiting hole on the first position limiting member. On the premise that the first member is connected with the first position limiting member by the position limiting pair, the position limiting post is fitted with the position limiting hole on the first position limiting member to realize the fixed connection between the first member and the first position limiting member.

Preferably, the upper cover assembly is provided with a heat insulation assembly, and the first position limiting member is a positioning hole provided in the heat insulation assembly. The first position limiting mechanism is a first protruding portion that is cooperated with the positioning hole. The second position limiting mechanism is a second protruding portion. The second position limiting member is provided with a sliding block connected with the heat insulation assembly by a positioning plate. An elastic member is provided between the sliding block and the heat insulation assembly. The sliding block is provided with a sliding surface cooperated with the second protruding portion. The sliding block is provided with a position limiting protruding portion connected with a second hook body and the elastic member. The heat insulation assembly is provided with the positioning hole, and the first position limiting member is the positioning hole and the first position limiting mechanism is the first protruding portion. The connection between the first member and the heat insulation assembly is realized by the cooperated connection between the first protruding portion and the positioning hole. The sliding block is slidingly connected with the heat insulation assembly by the positioning plate to realize the sliding connection between the sliding block and the heat insulation assembly. Under the action of the elastic member, the sliding block is capable of moving reciprocally relative to the heat insulation assembly. The sliding block is provided with the sliding surface. The sliding surface is pressed by the second protruding portion to realize the movement of the sliding block relative to the heat insulation assembly. When the second protruding portion crosses the sliding surface, the sliding block is reset under the action of the elastic member. The position limiting protruding portion realizes position limitation to the second protruding portion and the sliding block.

Preferably, the first member is provided with a first assembly and a second assembly. The second assembly is sealedly connected with the first assembly by a sealing gasket. The first position limiting mechanism is fixedly connected with the first assembly. The second position limiting mechanism is connected with the first assembly by a sealing ring. The sealed connection between the first assembly and the second assembly is realized by the sealing gasket, and the first position limiting mechanism is fixedly provided on the first assembly, and the second position limiting mechanism is connected with the first assembly by the seal ring, thereby improving the tightness of the connection.

Preferably, the first member is provided with a pressure limiting valve assembly. The sealing gasket is provided with an arc-shaped structure cooperated with the cooker body. The pressure limiting valve assembly is provided with an exhaust pipe and a protective shield which is connected with the first assembly, and the exhaust pipe is connected with the first assembly by the sealing ring. The first member is provided with the pressure limiting valve assembly to adjust the pressure in the cooker body during use. In order to further improve the sealing of the first member to the cooker body, the sealed cooperation between the sealing gasket and the cooker body is improved by the arc-shaped structure.

Preferably, the heat insulation assembly is provided with a first heat insulation shield and a second heat insulation shield. A protective shield is provided between the heating assembly and the second heat insulation shield. The wind power assembly is provided with a fan provided between the protective shield and the second heat insulation shield. The fan is driven by the wind power assembly to rotate. The heat insulation assembly is used for isolating the high temperature generated during the use of the cooker, and the first heat insulation shield and the second heat insulation shield are cooperated with each other to realize good heat insulation performance. The protective shield is provided between the heating assembly and the second heat insulation shield to protect the second heat insulation shield. The fan rotates under the drive of the wind power assembly to realize the flowing of hot air and the function of air fryer.

Compared with the prior art, the present invention has the following characteristics. Mutual switch between the function of pressure cooker and the function of air fryer can be realized by the switch of the functions of the first member, and the two functions can be concentrated on one cooker to realize the purpose of multifunctional cooker.

DESCRIPTION OF THE EMBODIMENTS

Figure 1:
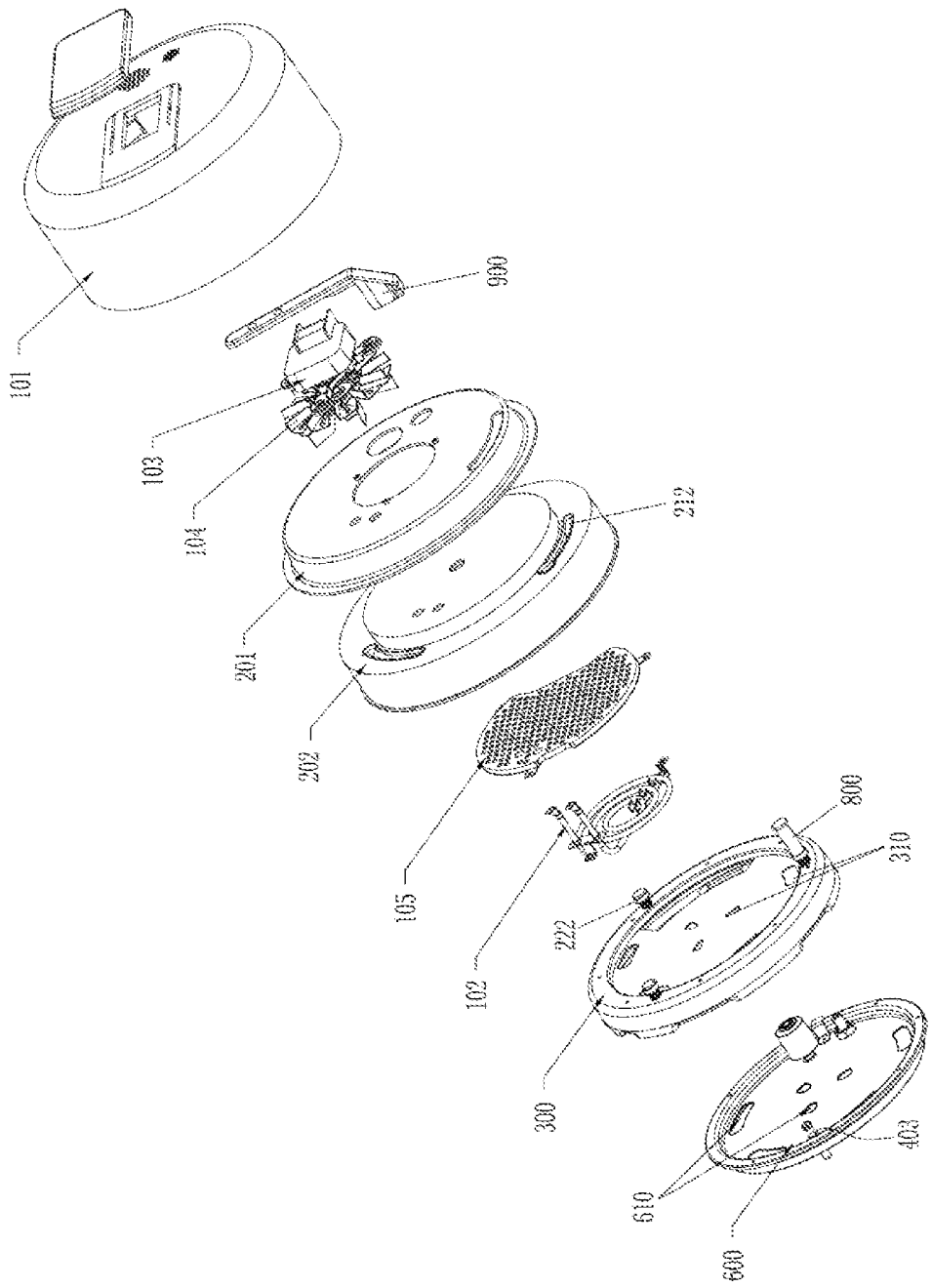
FIG. 1 is an exploded schematic view of an overall structure in an embodiment of the present invention.

The accompanying drawings are only for exemplary description, and shall not be construed as limiting the present invention. For ease of description, some parts or elements in the accompanying drawings may be omitted, scaled up or scaled down, which do not represent the practical dimensions of the product. For a person skilled in the art, it is understandable that some commonly known structures may be omitted in accompanying drawings and that their descriptions may be omitted. The positional relationship described in the accompanying drawings is for illustrative purposes only, and cannot be understood as limiting to the present invention.

The same or similar reference numerals in the drawings of the embodiments of the present invention correspond to the same or similar parts; in the description of the present invention, it should be understood that if there are orientations or positional relationships indicated by terms "upper", "lower", "left", "right" etc., then they are based on the orientation or positional relationship shown in the drawings. The terms are only for the convenience of describing the present invention and simplifying the description, rather than indicating or implying that the device or element referred to must have a specific orientation and must be constructed and operated in specific orientation. Thus, the terms used to describe the positional relationship in the drawings are for illustrative purposes only, and cannot be understood as a limitation of this patent. For those of ordinary skill in the art, the specific meaning of the above terms can be understood according to specific circumstances.

Embodiment 1

As shown in FIG. 1, the present invention provides a multifunctional cooker, which is provided with a cooker body 109 and an upper cover assembly. The cooker body 109 is rotatably connected with the upper cover assembly. The upper cover assembly is provided with a heat insulation assembly 200, a heating assembly 102 and a wind power assembly 103.

Figure 4:
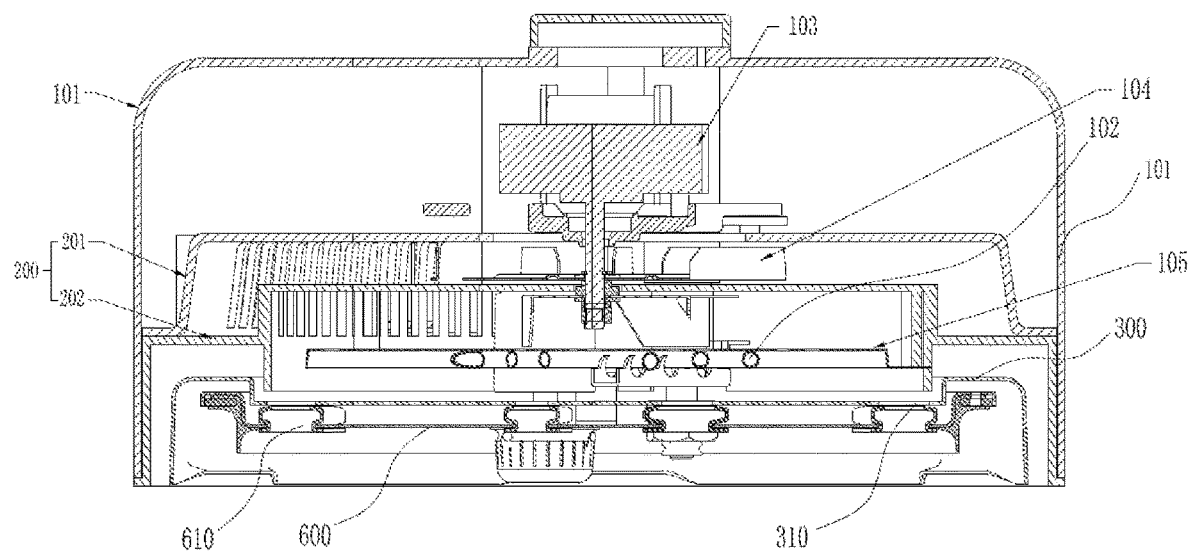
FIG. 4 is a schematic structural view of an upper cover assembly in the embodiment of the present invention.

As shown in FIG. 4, the heat insulation assembly 200 is provided with a first heat insulation shield 201 and a second heat insulation shield 202, and the first heat insulation shield 201 and the second heat insulation shield 202 are connected with each other. The first heat insulation shield 201 and the second heat insulation shield 202 are fixedly connected with an upper shell 101 provided on the upper cover assembly.

The wind power assembly 103 is provided with a driving motor. The driving motor is fixedly provided on the first heat insulation shield 201. A driving shaft of the driving motor passes through the first heat insulation shield 201 and the second heat insulation shield 202, and a fan 104 is connected to one end of the driving shaft.

As shown in FIG. 4, the cooker body 109 is provided with an inner pot 106 that realizes the function of pressure cooker and a fry basket 107 that realizes the function of air fryer. The inner pot 106 is used when realizing the function of pressure cooker, and the fry basket 107 is used when realizing the function of air fryer. The heating assembly 102 is provided with a heating tube, and the heating assembly 102 is provided between the second heat insulation shield 202 and the fry basket 107. The fan 104 is provided between the heating assembly 102 and the second heat insulation shield 202. A protective shield 105 is provided between heating assembly 102 and the fan 104. The contact between the fan 104 and the human body is avoided by the protective shield 105 to ensure the safety of the use process.

Figure 2:
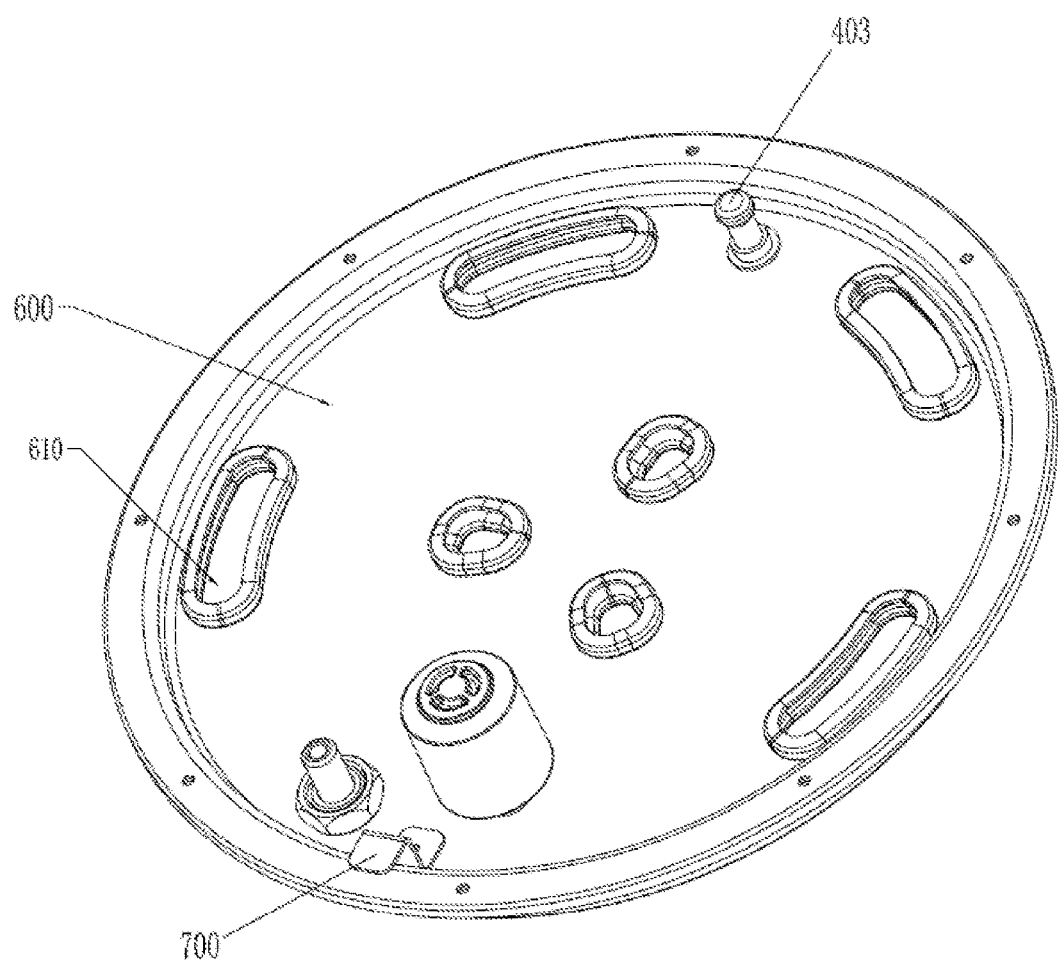
FIG. 2 is a schematic structural view of a first member in the embodiment of the present invention.

As shown in FIG. 1 and FIG. 2, in this embodiment, the multifunctional cooker is provided with a first member 600, and the first member 600 is a structure which is cooperated with the shape of the cooker body 109. The first member 600 is provided with a cover plate cooperated with an opening 310 of the cooker body 109. At least two air ducts 610 are provided on the cover plate and the at least two air ducts 610 realize ventilation for the cooker body 109.

The first member 600 is provided with a switch assembly, and the switch assembly is provided with a sealing member rotatably cooperated with the first member 600. The sealing member is a plate-shaped structure which is cooperated with the shape of the air duct 610. The switch assembly is provided with a driving structure. The sealing member is driven by the driving structure to rotate, thereby realizing that the air duct 610 is sealed by the sealing member. The driving structure is arranged to be a driving motor on the first member 600 or a transmission structure provided with a driving motor.

Figure 7:
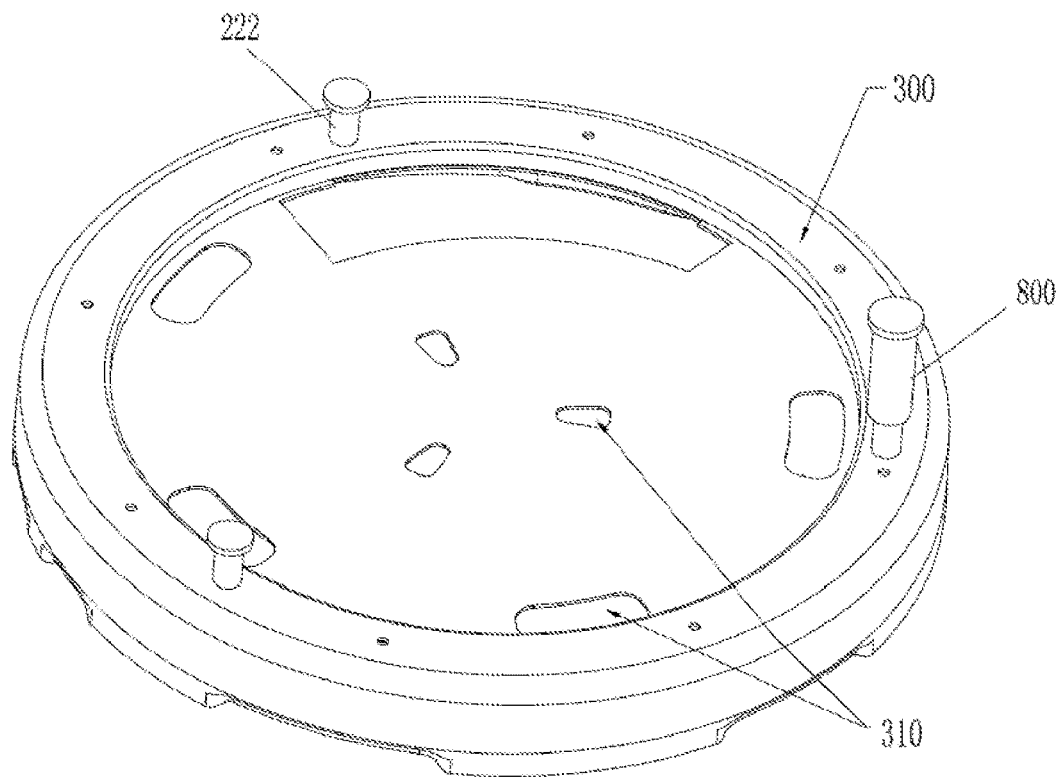
FIG. 7 is a schematic structural view of the first position limiting member in the embodiment of the present invention.
Figure 8:
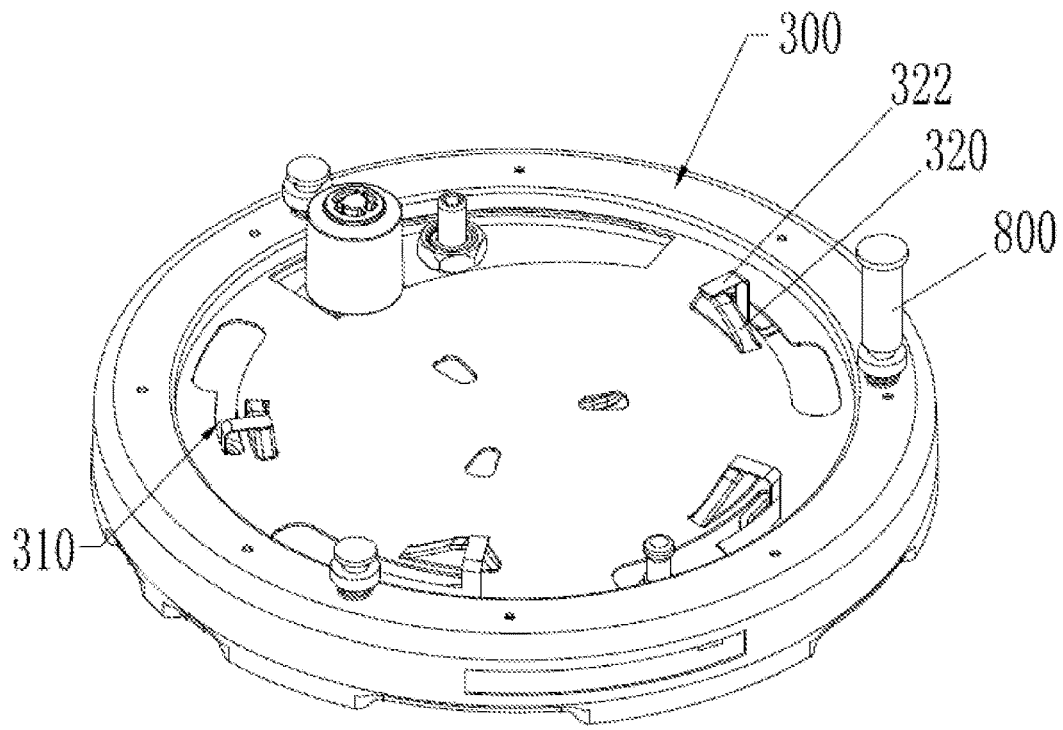
FIG. 8 is a schematic structural view of the first position limiting member in the embodiment of the present invention.
Figure 9:
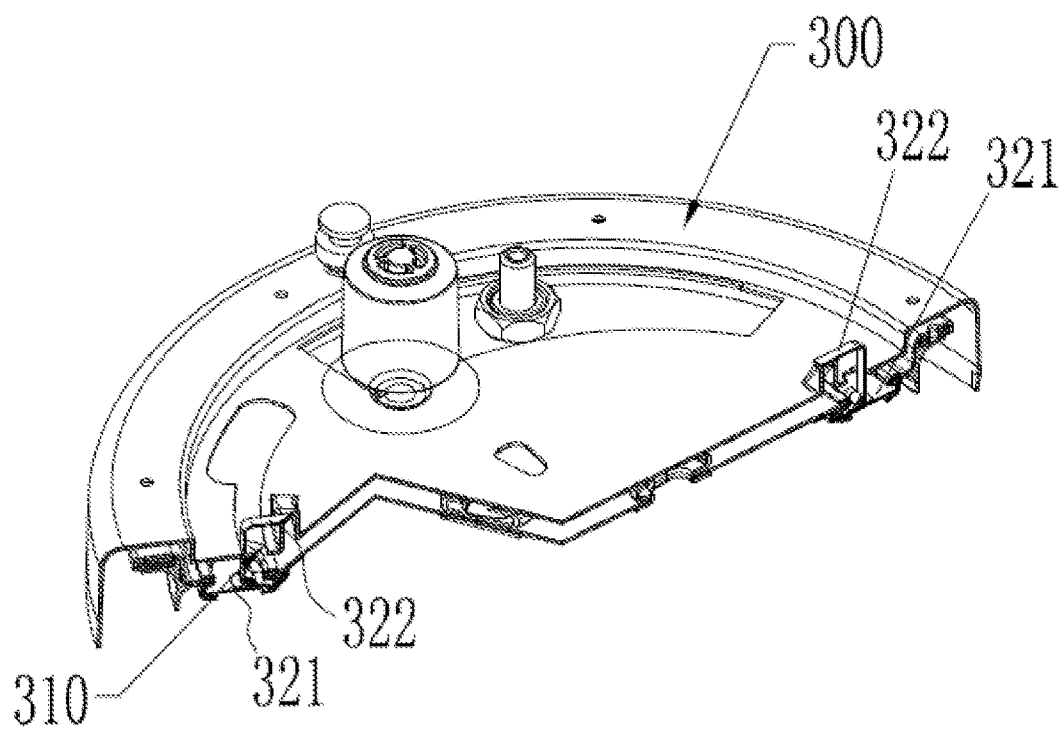
FIG. 9 is a schematic structural view of a switch assembly in the embodiment of the present invention.
Figure 10:
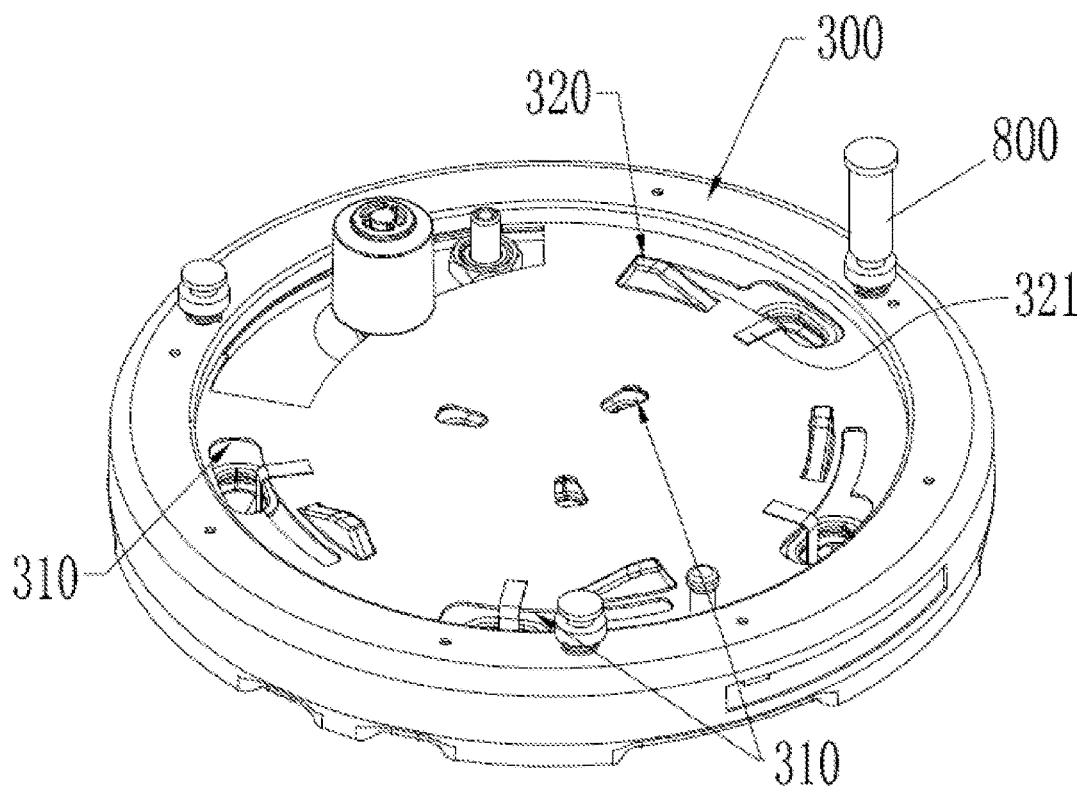
FIG. 10 is a schematic structural view of the switch assembly in the embodiment of the present invention.
Figure 11:
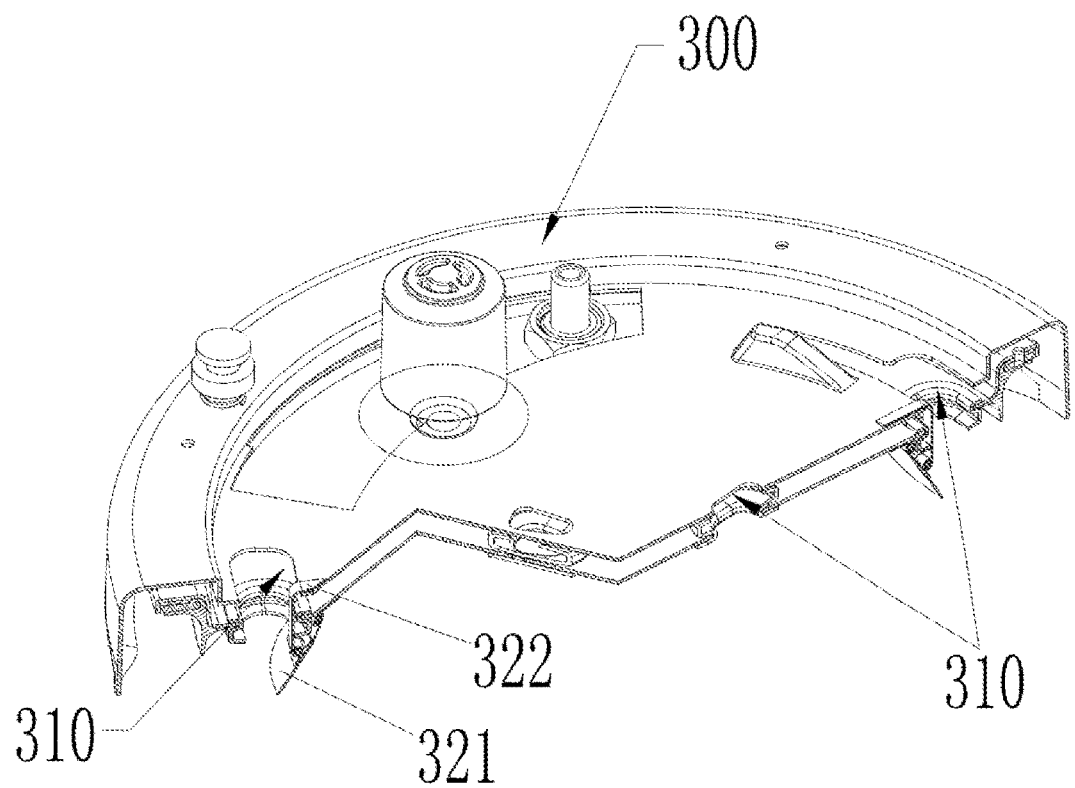
FIG. 11 is a schematic structural view of the switch assembly in the embodiment of the present invention.
Figure 12:
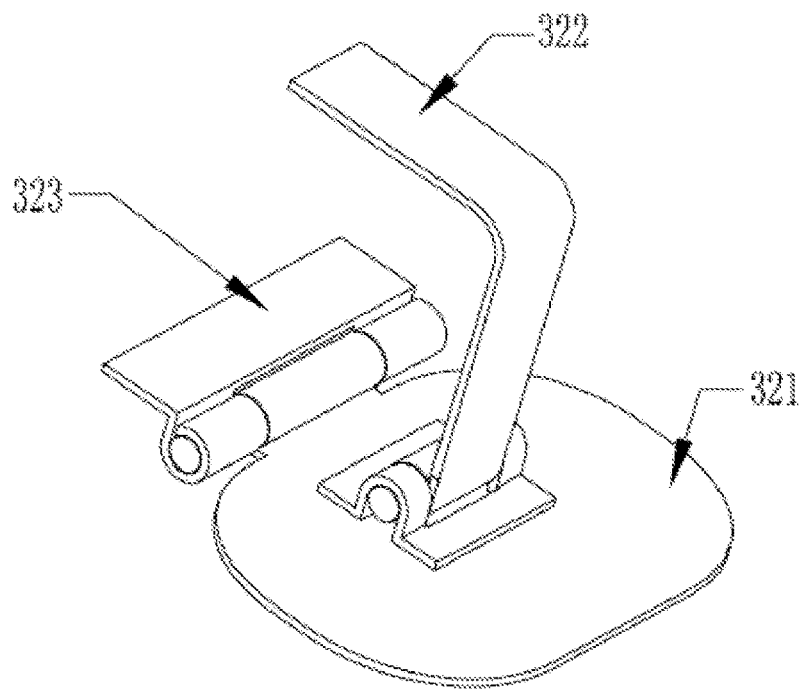
FIG. 12 is a schematic structural view of the switch assembly in the embodiment of the present invention.

As shown in FIG. 1 and FIG. 7, the upper cover assembly is provided with a first position limiting member 300, and the first position limiting member 300 is a steel cover structure provided on the upper cover assembly. The first position limiting member 300 is provided with a cylinder body 800. The cylinder body 800 is connected with a handle 900 of the multifunctional cooker, and the first position limiting member 300 is driven by the handle 900 to rotate relative to the upper cover assembly. The first position limiting member 300 is provided with the opening 310 cooperated with the air duct 610. The position of the opening 310 on the first position limiting member 300 corresponds to the position of the air duct 610 on the first member 600.

Figure 5:
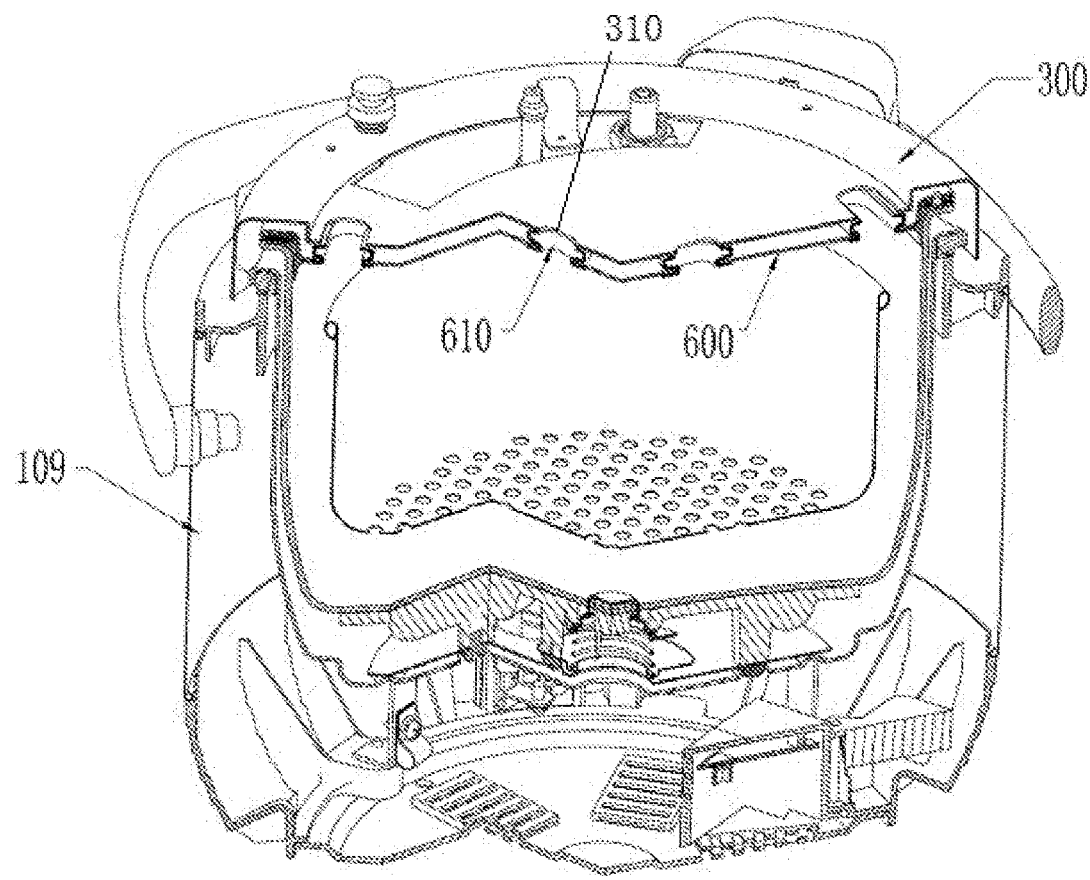
FIG. 5 is a schematic structural view which shows the cooperation between the first member and a first position limiting member in the embodiment of the present invention.
Figure 6:
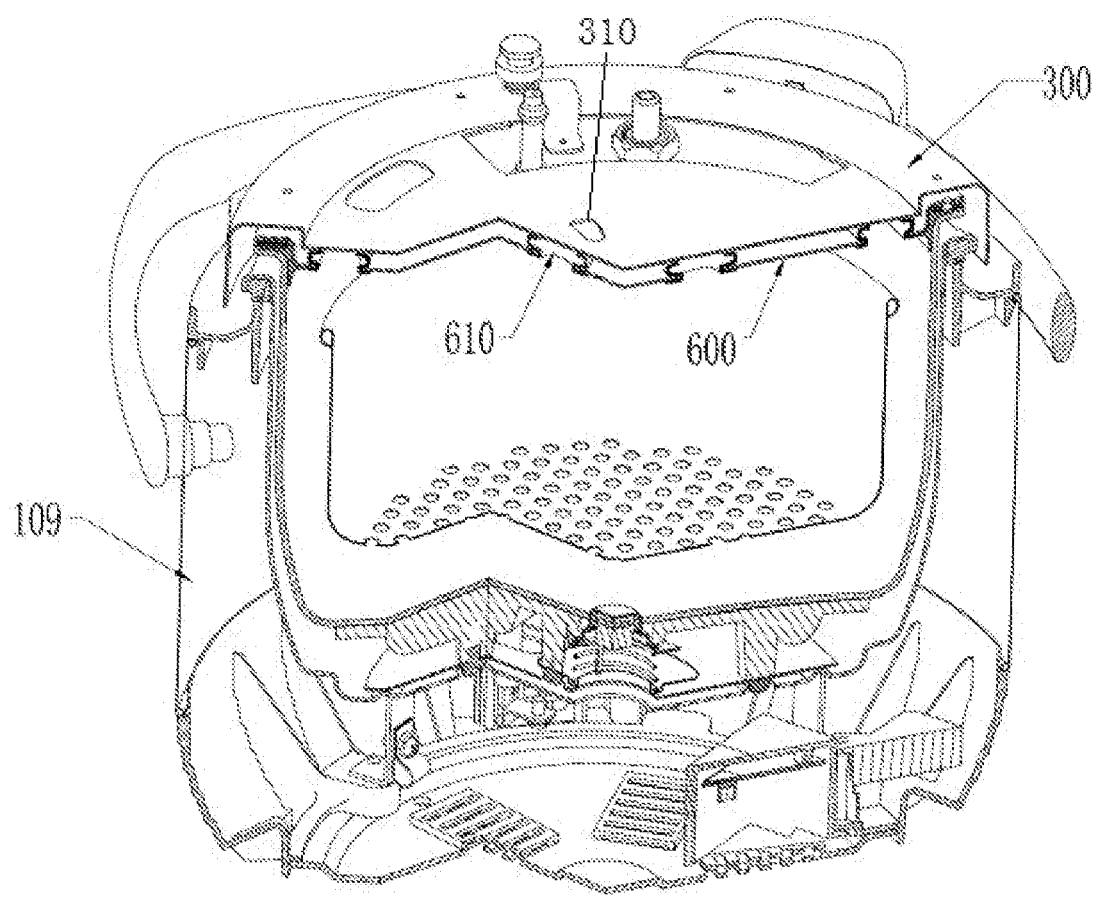
FIG. 6 is a schematic structural view which shows the cooperation between the first member and the first position limiting member in the embodiment of the present invention.

As shown in FIG. 5 and FIG. 6, the first member 600 and the first position limiting member 300 are both connected with the upper cover assembly, and the first member 600 and the first position limiting member 300 are arranged in a manner of being engaged to each other. The position limiting member 300 rotates relative to the first member 600 to realize the communication between the opening 310 and the air duct 610, and to realize opening of the air duct 610. The upper cover assembly is communicated with the cooker body 109 by the air duct 610. The heating assembly 102 and the wind power assembly 103 acts on the cooker body 109 to realize the function of air fryer.

The first position limiting member 300 rotates relative to the first member 600 to realize the misalignment between the opening 310 and the air duct 610. The air duct 610 is closed by the first position limiting member 300, and the cooker body 109 is sealed by the first member 600 to realize the function of pressure cooker.

In this embodiment, the air duct 610 is provided with a sealing gasket, the connection between the first member 600 and the first position limiting member 300 is sealed by the sealing gasket to realize the airtight connection between the air duct 610 and the first position limiting member 300.

Embodiment 2

This embodiment is similar to Embodiment 1, except that in this embodiment, the air duct 610 is provided with two parts on the first member 600, and the two parts are an air inlet duct and an air outlet duct respectively. The air outlet duct and the air inlet duct are distributed along concentric circles on the first member 600. The air inlet duct is provided at an edge region of the first member 600, and the air outlet duct is provided at a center region of the first member 600.

Embodiment 3

Figure 3:
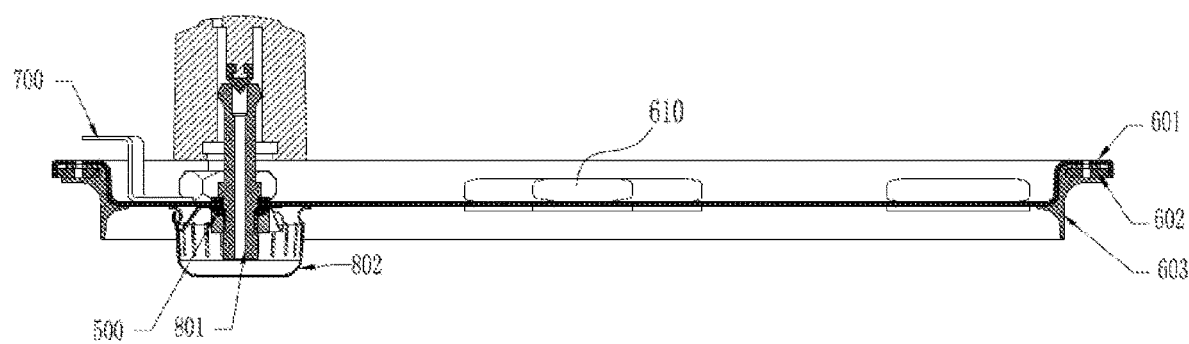
FIG. 3 is a sectional schematic structural view of the first member in the embodiment of the present invention.

This embodiment is similar to Embodiment 1, except that in this embodiment, as shown in FIG. 3, the first member 600 is provided with a first assembly 601 and a second assembly 602, and the first assembly 601 is connected with the second assembly 602 by a sealing gasket 603. The sealing gasket 603 is an arc-shaped structure, and the sealed connection between the first member 600 and the inner pot 106 is realized by the arc-shaped structure.

As shown in FIG. 2 and FIG. 3, the first assembly 601 is provided with a second position limiting mechanism 403 and a first position limiting mechanism 700. The heat insulation assembly 200 is provided with a second position limiting member 203 and the second position limit mechanism 403 can be fittedly connected with the second position limiting member 203 to realize the connection between the first member 600 and the second heat insulation shield 202.

The first position limiting mechanism 700 is fixedly connected to the first assembly 601. The first position limiting mechanism 700 is a Z-shaped position limiting pair, and a gap is provided between the first position limiting mechanism 700 and the first assembly 601. The second heat insulation shield 202 is provided with a sliding rail 212, and the sliding rail 212 is connected with a connecting rod 222 sealedly connected with the first position limiting member 300, thereby realizing the fixed connection of the first position limiting member 300 relative to the heat insulation assembly 200.

As shown in FIG. 1, a plurality of sliding rails 212 are provided on the second heat insulation shield 202. The plurality of sliding rails 212 are cooperated with the connecting rod 222 to realize the fixed connection of the first position limiting member 300 relative to the heat insulation assembly 200.

The first position limiting member 300 is fitted between the first position limiting mechanism 700 and the first assembly 601 by providing a gap between the first position limiting mechanism 700 and the first assembly 601, thereby realizing the fixed connection between the first assembly 601 and the first position limiting member 300. Under the joint action that the second position limiting mechanism 403 is fitted with the second position limiting member 203 and that the first position limiting member 300 is fitted between the first position limiting mechanism 700 and the first assembly 601, the fixed connection between the first member 600 and the upper cover assembly is realized.

The upper cover assembly is closed relative to the cooker body 109, and the first member 600 presses against the edge of the inner pot 106 to seal the inner pot 106, and the pressure in the inner pot 106 is adjusted by a pressure limiting valve assembly provided on the first member 600. A heating plate assembly 108 realizes the function of pressure cooker.

As shown in FIG. 3, the pressure limiting valve assembly is provided with an exhaust pipe 801 and a protective shield 802 which is connected with the first assembly 601. The exhaust pipe 801 is connected with the first assembly 601 by a seal ring 500.

Embodiment 4

Figure 13:
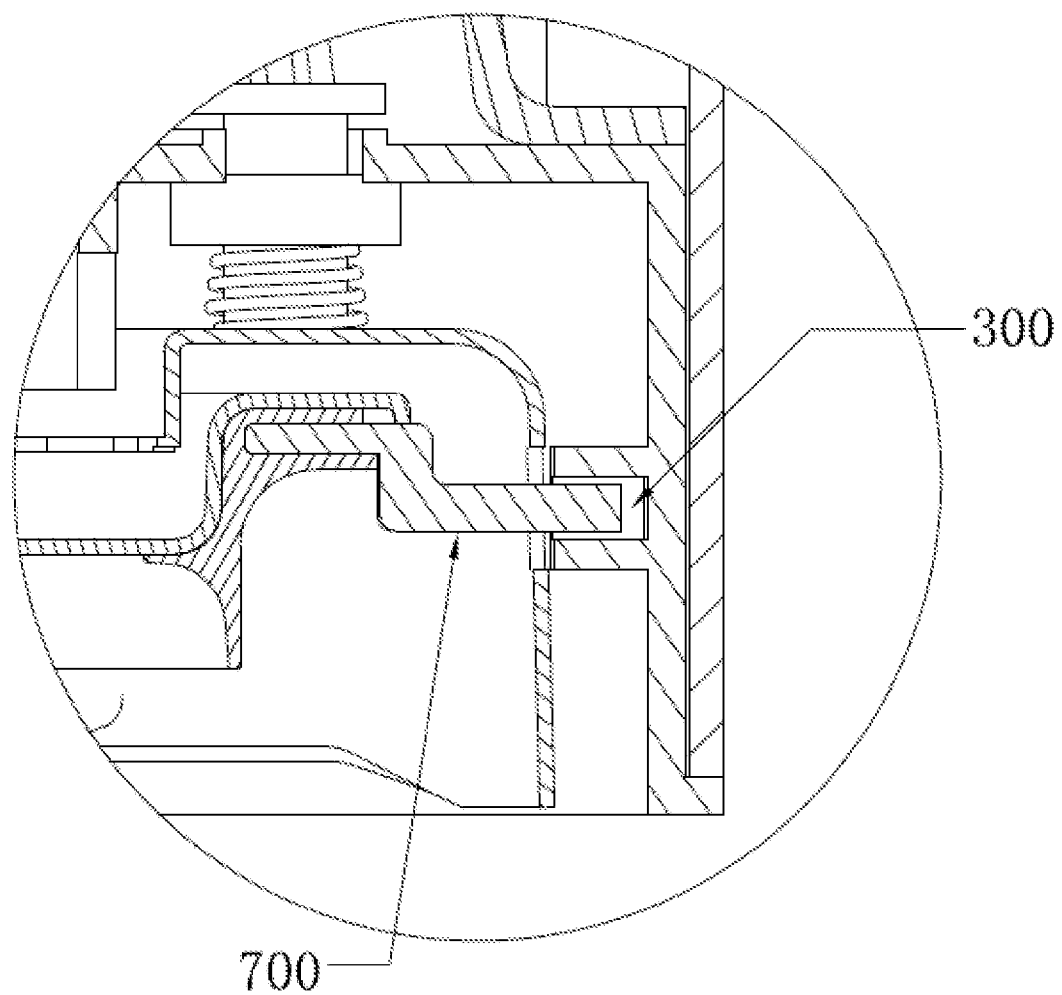
FIG. 13 is a schematic structural view which shows the connection between the first member and the upper cover assembly in the embodiment of the present invention.
Figure 14:
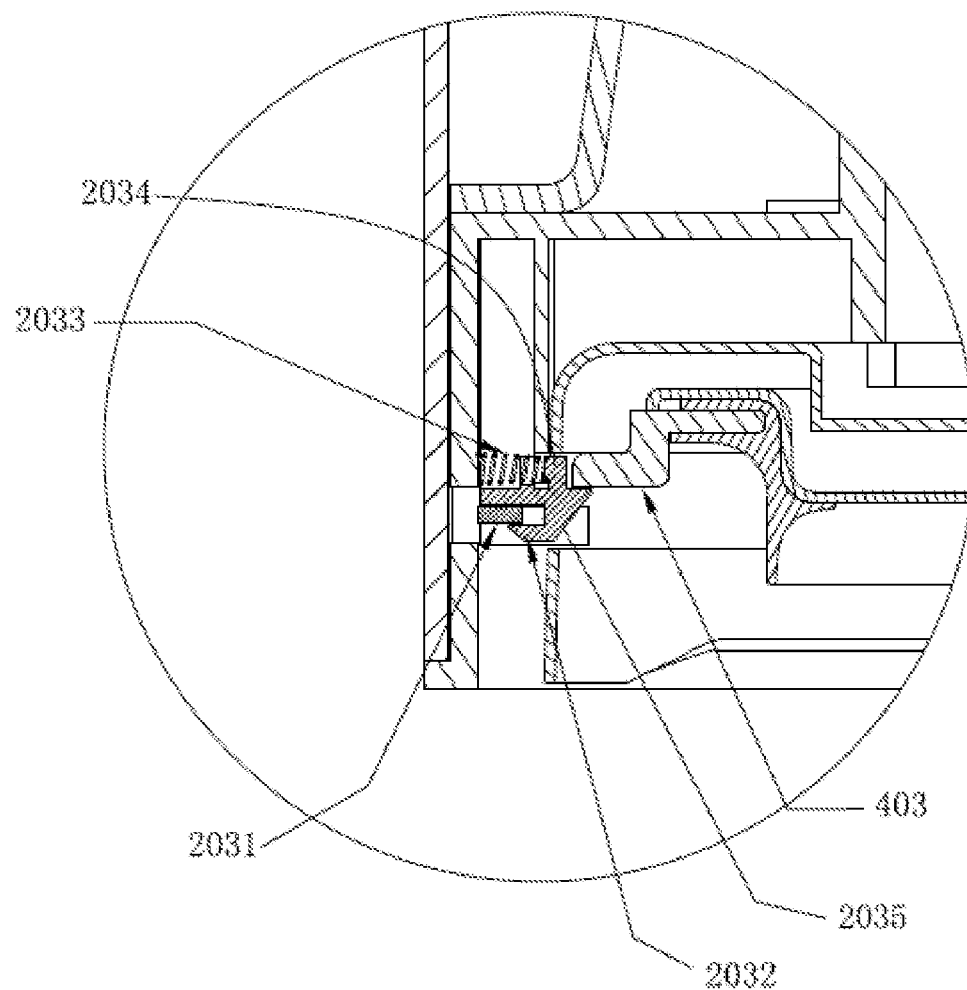
FIG. 14 is a schematic structural view which shows the connection between the first member and the upper cover assembly in the embodiment of the present invention.

As shown in FIG. 13 and FIG. 14, this embodiment is similar to Embodiment 3, except that in this embodiment, the first position limiting member 300 is a positioning hole connected to the heat insulation assembly 200, and the first position limiting mechanism 700 is a first protruding portion cooperated with first position limiting member 300. The second position limiting mechanism 403 is a second protruding portion, and the second position limiting member 203 is provided with a sliding block 2032 connected with a heat insulation assembly 200 by a positioning plate 2031. An elastic member 2033 is provided between the sliding block 2032 and the heat insulation assembly 200 and the sliding block 2032 is provided with a position limiting protruding portion 2034 connected with the second position limiting mechanism 403 and the elastic member 2033.

Under the action of the elastic member 2033, the sliding block 2032 is capable of moving reciprocally relative to the heat insulation assembly 200. The sliding block 2032 is provided with a sliding surface. When the second position limiting mechanism 403 is mounted, movement of the sliding block 2032 relative to the heat insulation assembly 200 is realized by pressing the sliding surface. When the second position limiting mechanism 403 crosses the sliding surface, the sliding block 2032 is reset under the action of the elastic member 2033, and the connection between the second position limiting mechanism 403 and the second position limiting member 203 is realized. The connection between the second position limiting mechanism 403 and the second position limiting member 203 is cooperated with the connection of the first position limiting member 300 and the first position limiting mechanism 700 to realize the fixation of the first member 600.

Embodiment 5

This embodiment is similar to Embodiment 1, except that in this embodiment, as shown in FIG. 8 to FIG. 12, the first member 600 is provided with a switch assembly, and the switch assembly is provided with a sealing member rotatably cooperated with the first member 600. The sealing member is a plate-shaped structure which is cooperated with the shape of the air duct 610. The switch assembly is provided with a driving structure. The sealing member is driven by the driving structure to rotate, thereby realizing that the air duct 610 is sealed by the sealing member.

In this embodiment, the driving member is a rod-shaped structure. One end of the driving member is rotatably connected with the sealing member, and the other end is provided with a hook body which is connected with the first position limiting member 300.

The first position limiting member 300 is provided with a position limiting pair that is cooperated with the hook body. The position limiting pair is a protruding structure on the first position limiting member 300. The protruding structure is provided with an inclined surface that is cooperated with the hook body. When the position member 300 rotates relative to the first member 600, the hook body is pressed by the protruding structure and rises along the inclined surface, and the sealing member is pulled by the driving member to rotate relative to the air duct 610, and the air duct 610 is closed and sealed. When the air duct 610 is opened, the first position limiting member 300 is rotated, and the hook body descends along the inclined surface, thereby realizing that the sealing member rotates relative to the air duct 610, and that the air duct 610 is opened.

Obviously, the above-mentioned embodiments of the present invention are merely examples for clearly illustrating the present invention, rather than limiting the embodiments of the present invention. For those of ordinary skill in the art, other different forms of changes or variations can be made based on the above description. There is no need to exhaustively list all implementations. Any modification, equivalent replacement and improvement made within the spirit and principle of the present invention should be included in the protection scope of the claims of the present invention.

What is claimed is:

1. A multifunctional cooker, comprising a cooker body and an upper cover assembly, wherein the upper cover assembly is provided with a heating tube and a fan, the multifunctional cooker further comprises a first member cooperated with the upper cover assembly, the first member is provided with an air duct, the first member realizes sealing of the cooker body or realizes releasing of the sealing of the cooker body through a state change of the air duct, and the first member is capable of releasing pressure when a pressure inside the cooker body exceeds a threshold, wherein the upper cover assembly is provided with a first position limiting member, the first position limiting member is provided with an opening cooperated with the air duct, the first position limiting member moves relative to the first member, and opening and closing of the air duct is realized by a cooperation between the opening and the air duct, the first position limiting member is provided with a cylinder body connected with a handle that drives the first position limiting member to rotate.

2. The multifunctional cooker according to claim 1, wherein the air duct is provided with a sealing gasket, and the sealing gasket realizes an airtight connection between the air duct and the first position limiting member.

3. The multifunctional cooker according to claim 1, wherein the first member is connectable with the upper cover assembly, the first member is provided with a switch assembly cooperated with the air duct, and the switch assembly is capable of realizing opening and closing of the air duct.

4. The multifunctional cooker according to claim 3, wherein the switch assembly is provided with a sealing member rotatably cooperated with the first member, and the sealing member realizes sealing of the air duct by a motor.

5. The multifunctional cooker according to claim 1, wherein the first member is provided with a switch assembly cooperated with the air duct, and the switch assembly is capable of realizing opening and closing of the air duct.

6. The multifunctional cooker according to claim 5, wherein the switch assembly is provided with a sealing member rotatably cooperated with the first member, and the sealing member realizes sealing of the air duct by a motor.

7. The multifunctional cooker according to claim 6, wherein the motor is provided with a driving member connected with the sealing member, the first position limiting member is provided with a position limiting pair cooperated with the driving member, and the driving member is driven by the position limiting pair to operate when the first position limiting member moves relative to the first member.

8. The multifunctional cooker according to claim 1, wherein the first member is provided with at least two of the air ducts, and the at least two of the air ducts realizes a cooperation between inletting of air and exhausting of air.

9. The multifunctional cooker according to claim 1, wherein the first member is provided with a first position limiting mechanism which is cooperatively connectable with the first position limiting member, the upper cover assembly is provided with a second position limiting member, and the first member is provided with a second position limiting mechanism which is cooperatively connectable with the second position limiting member.

10. The multifunctional cooker according to claim 9, wherein the first position limiting member is capable of realizing a fixed connection between the upper cover assembly and the cooker body, the first position limiting mechanism is a position limiting pair connected with the first position limiting member, the second position limiting member is a position limiting hole on the first position limiting member, and the second position limiting mechanism is a position limiting post on the first member.

11. The multifunctional cooker according to claim 9, wherein the upper cover assembly is provided with a heat insulation assembly, the first position limiting member is a positioning hole provided in the heat insulation assembly, the first position limiting mechanism is a first protruding portion that is cooperated with the positioning hole, the second position limiting mechanism is a second protruding portion, the second position limiting member is provided with a sliding block connected with the heat insulation assembly by a positioning plate, an elastic member is provided between the sliding block and the heat insulation assembly, the sliding block is provided with a sliding surface cooperated with the second protruding portion, and the sliding block is provided with a position limiting protruding portion connected with a second hook body and the elastic member.

12. The multifunctional cooker according to claim 11, wherein the heat insulation assembly is provided with a first heat insulation shield and a second heat insulation shield, a protective shield is provided between the heating tube and the second heat insulation shield; and the fan is provided with a fan provided between the protective shield and the second heat insulation shield, and the fan is driven by the fan to rotate.

13. The multifunctional cooker according to claim 9, wherein the first member is provided with a first assembly and a second assembly, the second assembly is sealedly connected with the first assembly by a sealing gasket, the first position limiting mechanism is fixedly connected with the first assembly, the second position limiting mechanism is connected with the first assembly by a sealing ring.

14. The multifunctional cooker according to claim 13, wherein the first member is provided with a pressure limiting valve assembly, the sealing gasket is provided with an arc-shaped structure cooperated with the cooker body, the pressure limiting valve assembly is provided with an exhaust pipe and a protective shield which is connected with the first assembly, and the exhaust pipe is connected with first assembly by the sealing ring.

* * * * *